United States Patent Office 3,557,492
Patented Jan. 26, 1971

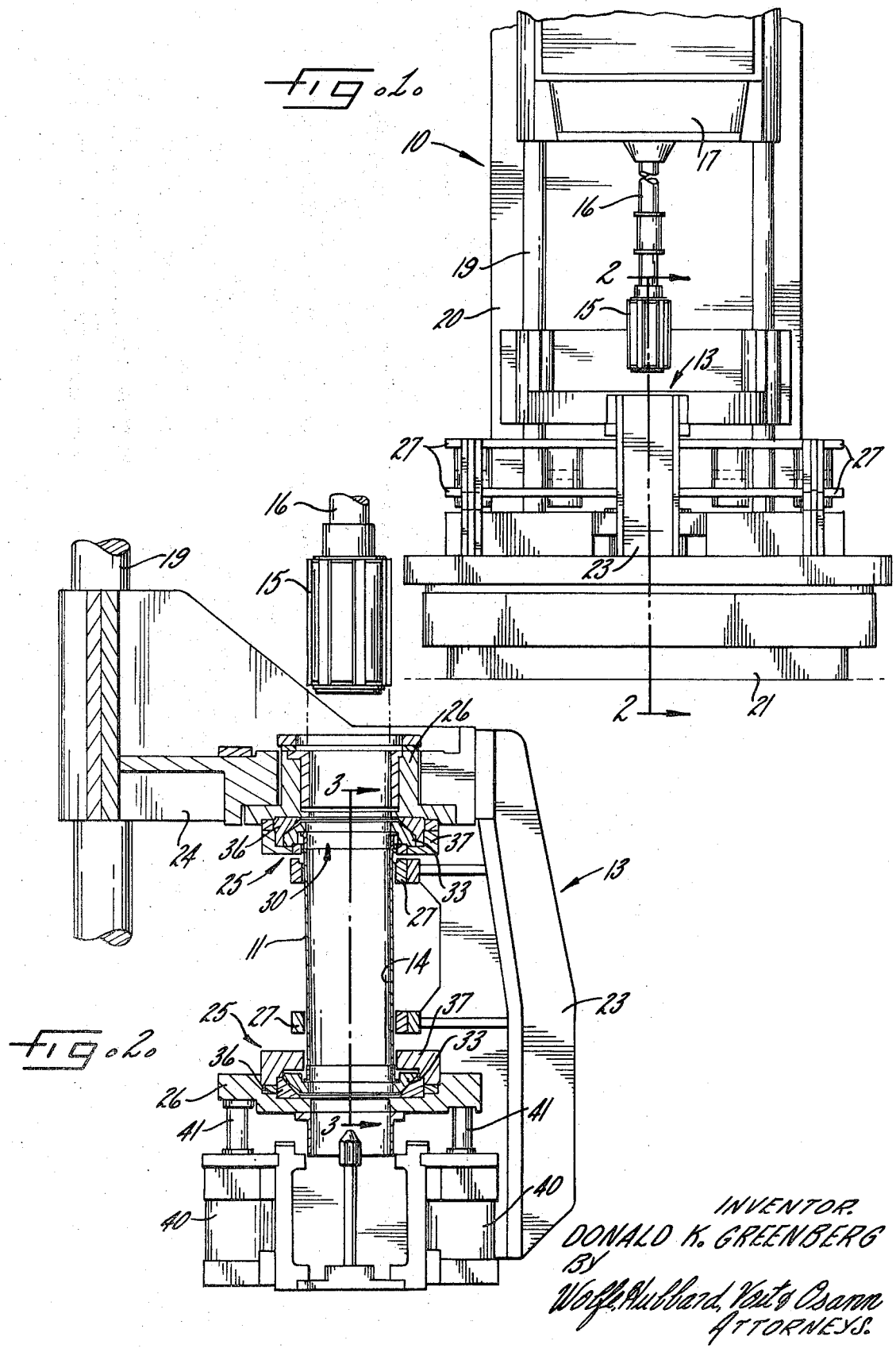

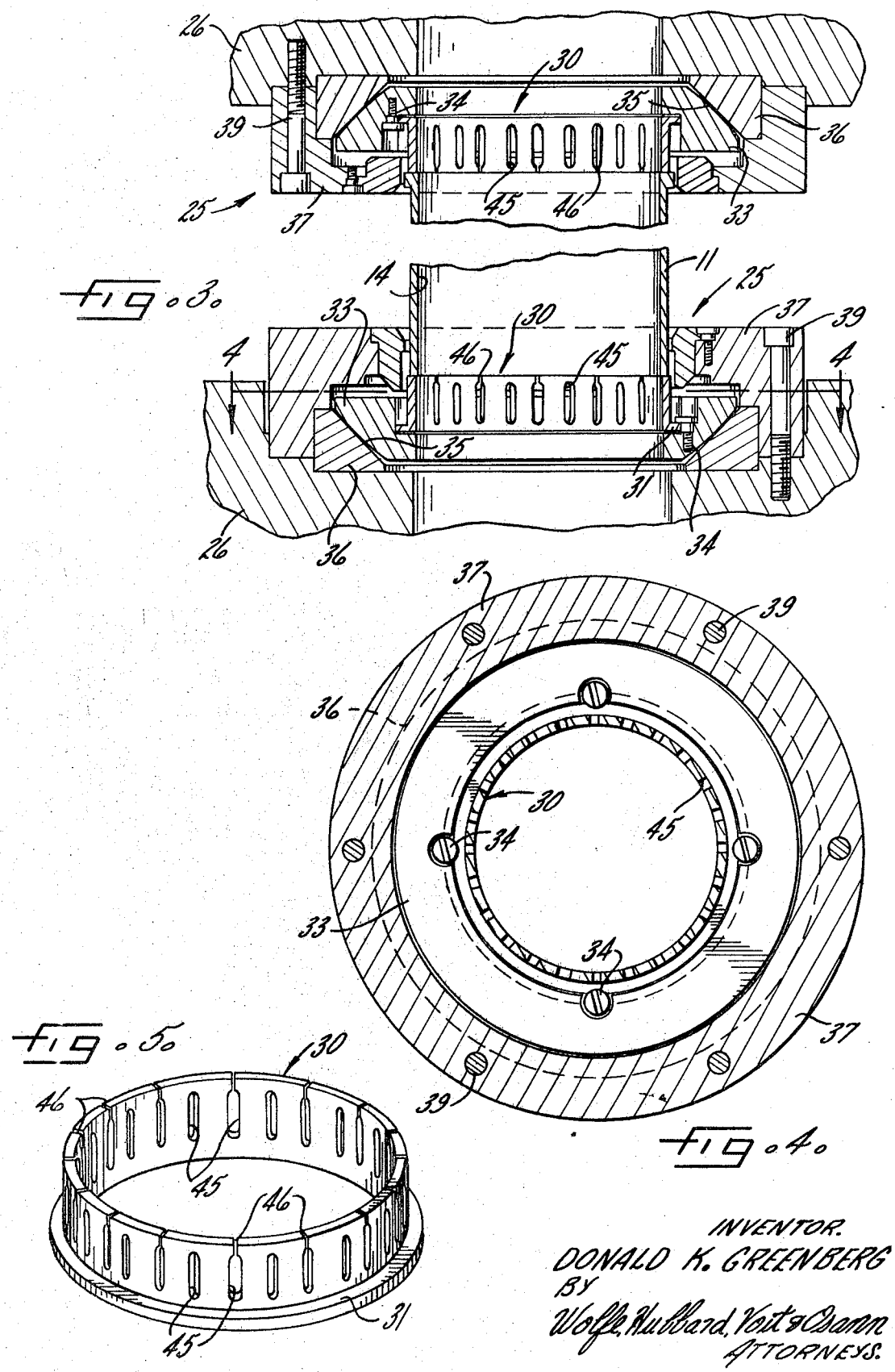

3,557,492
CLAMPING FIXTURE FOR A MACHINE TOOL
Donald K. Greenberg, Rockford, Ill., assignor to Barnes Drill Co., Rockford, Ill., a corporation of Illinois
Filed June 25, 1969, Ser. No. 836,259
Int. Cl. B24b 7/00
U.S. Cl. 51—34                                    5 Claims

ABSTRACT OF THE DISCLOSURE

A thin-walled sleeve is clamped endwise beneath a hone for enlarging a cylindrical bore in the sleeve by upper and lower clamping rings which hold the sleeve in place by applying frictional clamping pressure to the ends of the sleeve. The rings are radially expandable to allow the ends of the sleeve to flex outwardly as the hone progresses through the bore and thus promote honing of the bore to a more nearly perfect cylindrical shape by enabling uniform flexing of the sleeve throughout its entire length in spite of the clamping pressure applied to the ends of the sleeve.

BACKGROUND OF THE INVENTION

This invention relates to a clamping fixture and, more particularly, to a clamping fixture adapted for use with a machine having a reciprocable tool operable to advance through and enlarge a cylindrical bore in a work sleeve formed with relatively thin walls. Typical clamping fixtures include a pair of spaced clamping assemblies positioned at opposite ends of the sleeve and operable to exert axial clamping pressure on the sleeve to frictionally hold the latter in place as the tool advances through and enlarges the bore. Because of the thinness of the sleeve, the pressure exerted by the tool against the walls causes the walls to flex radially outwardly during the advance of the tool, the extent of such flexing affecting the final diameter to which the bore is enlarged.

SUMMARY OF THE INVENTION

The primary aim of the present invention is to provide a clamping fixture of the above character having new and improved clamping assemblies which, while exerting sufficient axial clamping pressure against the ends of the sleeve to lock the latter securely in place, still enable full radial flexure of the sleeve ends to allow the sleeve to flex more uniformly throughout its length under the pressure exerted by the tool so as to promote enlargement of the bore to a uniform diameter and cylindricalness.

A more detailed object is to achieve the foregoing through the provision of clamping assemblies having unique axially stiff but radially expandible clamping rings which are positioned in end-to-end frictional engagement with the sleeve and which, in effect, form flexible extensions of the sleeve itself to clamp the sleeve against bodily movement without restricting radial flexing of the ends of the sleeve as the tool passes through the bore.

The invention also resides in the novel construction of the clamping rings to increase the radial flexibility of the rings while maintaining the axial stiffness of the rings.

These and other objects and advantages of the invention will become more apparent from the following detailed description when taken in conjunction with the accompanying drawings.

BRIEF DESCRIPTION OF THE DRAWINGS

FIG. 1 is a fragmentary front elevation of an exemplary machine equipped with a clamping fixture embodying the novel features of the present invention.

FIG. 2 is an enlarged fragmentary cross-section taken substantially along the line 2—2 of FIG. 1.

FIG. 3 is an enlarged fragmentary cross-section taken substantially along the line 3—3 of FIG. 2.

FIG. 4 is a cross-section taken substantially along the line 4—4 of FIG. 3.

FIG. 5 is a perspective view of one of the novel clamping rings.

DETAILED DESCRIPTION OF THE PREFERRED EMBODIMENT

For purposes of illustration, the invention is shown in the drawings in conjunction with a vertical honing machine 10 in which an elongated cylindrical work sleeve 11 (FIG. 2) such as a cylinder liner is suitable clamped in a fixture 13 to locate its bore 14 in position to be honed in a succession of vertical reciprocations of an expandible rotary honing tool 15. The latter is carried on the lower end of a tubular spindle 16 (FIG. 1) projecting downwardly from and journaled on a rigid head 17 which is accurately guided along laterally spaced rods 19 mounted on a column 20 upstanding from the supporting base 21 of the machine. Suitable drive mechanism (not shown) is incorporated in the machine for reciprocating the head and rotating the spindle during a honing cycle in which the rotating hone first enters the bore, is expanded radially and then reciprocates upwardly and downwardly within the bore until the latter is enlarged to a precisely determined diameter.

The clamping fixture 13 for holding the sleeve 11 during the honing operation is located below the head 17 and includes an upstanding support member 23 (FIG. 2) which is anchored to the base 21 and which is connected at its upper end to a large bracket 24 attached rigidly to and projecting outwardly from the guide rods 19. Upper and lower clamping assemblies 25 with bases 26 are secured to the support member and the bracket and are adapted to exert axially directed frictional clamping pressure on the ends of the sleeve to lock the sleeve beneath the hone 15. Initially, the clamping assemblies are spaced vertically from one another a distance greater than the length of the sleeve to be honed. After the sleeve has been transferred automatically between the clamping assemblies along sets of horizontal guide rails 27 (FIGS. 1 and 2) extending along the machine base 21, the lower clamping assembly is shifted upwardly to engage the lower end of the sleeve and to force the sleeve upwardly into clamping engagement with the upper clamping assembly. The sleeve thus is clamped endwise and is held rigidly centered on the axis of the hone by virtue of the frictional engagement between the clamping assemblies and the ends of the sleeve.

In the present instance, the sleeve 11 is formed of hard cast iron of 45 Rockwell "C" hardness with an outside diameter of five inches, a length of about ten inches and with a wall thickness of only approximately 3/16 of an inch. Being relatively thin, the side walls of the clamped sleeve flex radially outwardly a slight distance as the expendible hone 15 advances through the sleeve and exerts radial pressure against the inner faces of the walls to enlarge the bore 14.

I have discovered that the frictional clamping pressure heretofore exerted against the ends of the sleeve by previously available clamping assemblies restricts and confines radial flexing of the sleeve ends to such an extent that the midportion of the sleeve has flexed outwardly a greater distance than the end portions thereby causing more metal to be honed away from the end portions of the sleeve than from the middle and resulting in the bore being finished to a shape resembling an hourglass rather than being perfectly cylindrical. Based upon this discovery, I have found that the axial clamping pressure against the ends of the sleeve 11 can be maintained and yet the resistance of the sleeve ends to outward flexing can be decreased by providing the clamping assemblies 25 with novel radially expandible clamping rings 30 which are capable of flexing radially as the hone 15 progresses through the bore 14, thereby to free the ends of the sleeve to flex to the same degree as the midportion. As a result, the radially flexible rings promote enlargement of the bore to a more nearly uniform diameter and cylindricalness throughout the entire length of the sleeve.

More particularly and as shown most clearly in FIG. 3, the clamping ring 30 of each clamping assembly 25 is adapted to be positioned end-to-end with the adjacent end of the sleeve 11 and is formed with an annular flange 31 which is clamped securely to a bearing 33 by screws 34. The bearing is of the self-alining type and is formed with spherically-contoured surfaces 35 which engage beveled surfaces on a bearing seat 36 to mount the clamping ring 30 for limited pivotal floating and thus allow the ring to mate squarely end-to-end with the sleeve 11 even though the end of the sleeve lies in a plane that is not perfectly perpendicular to the axis of the sleeve. Each bearing seat 36, in turn, is anchored rigidly to the base 26 of the respective clamping assembly 25 by an annular collar 37 which is fastened to the base by screws 39, the bearing seat thus being clamped between the collar and the base. To raise and lower the lower clamping assembly for purposes of clamping and unclamping the sleeve, two hydraulic actuators 40 (FIG. 2) with rods 41 are connected between the support member 23 and the base 26 of the lower assembly and may be selectively or automatically activated when the sleeve is to be clamped and unclamped.

With the foregoing arrangement, the lower clamping assembly 25 is raised after the sleeve 11 has been placed between the assemblies and thus the upper end of the lower clamping ring 30 butts end-to-end with the lower end of the sleeve and forces the sleeve upwardly to press the upper end of the sleeve into frictional clamping engagement with the lower end of the upper clamping ring 30. Accordingly, the sleeve is locked frictionally between the rings and beneath the hone 15 by the endwise clamping pressure prior to advancement of the hone into the bore 14 to enlarge the latter. As the lower clamping assembly is raised, the collars 37 serve to pilot the sleeve into engagement with the ends of the clamping rings.

In keeping with the invention, the clamping rings 30 are vertically stiff so as to exert clamping pressure against the sleeve 11 but are radially expandible so as to offer less resistance to radial flexing of the end portions of the sleeve as the expandible hone 15 advances through the bore 14 and exerts outward pressure against the walls of the sleeve. Herein, each clamping ring is cylindrical and is formed with a length of approximately one inch, a diameter of about five inches and a wall thickness of approximately 3/32 of an inch. Each ring is made of resiliently yieldable metal such as S.A.E. No. 4615 steel and this, together with the relatively thin walls of the sleeve, enables the ring to flex radially while being vertically stiff. Elongated slots 45 (FIG. 5) preferably are formed through and spaced angularly around the side walls of each ring to increase its radial flexibility. In addition, narrow slits 46 are cut through the walls of the sleeve and extend from the clamping end of the sleeve into every other slot to further increase the flexibility of the ring.

Being radially flexible, the clamping rings 30 extend the radial flexibility of the sleeve 11 to the extreme ends thereof in spite of the frictional clamping pressure applied to the ends and, in effect, constitute extensions of the sleeve. Thus, as the hone 15 enters into the upper end portion of the sleeve, the upper clamping ring expands outwardly to enable the upper end portion to flex to approximately the same extent as the midportion of the sleeve flexes upon continued advance of the hone. When the hone approaches the lower end portion of the sleeve, the lower clamping ring flexes outwardly to allow the outward flexure of the lower end portion to match that of the midportion. As a result, the sleeve flexes substantially uniformly throughout its entire length to enable honing of the bore 14 to a precisely uniform diameter and cylindricalness.

I claim as my invention:

1. A clamping fixture for use with a machine having a tool reciprocable along a predetermined axis for enlarging an axially extending bore formed through a cylindrical sleeve with relatively thin side walls which tend to flex radially outwardly under the pressure exerted by the tool, said fixture comprising a support, a pair of spaced clamping assemblies mounted on said support adjacent opposite ends of the sleeve with one of the clamping assemblies being movable toward the other assembly to clamp the ends of the sleeve frictionally between the assemblies with an axially directed force, each of said clamping assemblies comprising a base mounted on said support adjacent an end of the sleeve, and a ring supported on each base with one end in frictional clamping engagement with the adjacent end of the sleeve, each of said rings having axially stiff and radially expandable walls of resiliently yieldable material capable of flexing outwardly thereby to enable outward radial flexing of the end portion of the sleeve as the tool moves through such end portion and thus promote uniform flexing of the sleeve throughout its length during enlargement of the bore.

2. A clamping fixture as defined in claim 1 further including angularly spaced elongated slots formed in the walls of each ring to increase the radial flexibility of the ring.

3. A clamping fixture as defined in claim 2 in which the slots in each ring extend axially and are located intermediate the ends of the ring, and further including narrow slits formed through the walls of said ring and extending from said one end of said ring into certain ones of said slots.

4. A clamping fixture for use with a machine having a tool reciprocable along a predetermied axis for enlarging a cylindrical bore formed through a sleeve with relatively thin side walls which tend to flex radially under the pressure exerted by the tool, said fixture comprising a support, a pair of spaced clamping assemblies mounted on said support adjacent opposite ends of the sleeve with one of the clamping assemblies being movable toward the other assembly to clamp the ends of the sleeve frictionally between the assemblies with an axially directed force, at least one of said clamping assemblies comprising a ring mounted on said support with one end positioned for frictional clamping engagement with the adjacent end of the sleeve, said ring having axially stiff and radially expandable walls of resiliently yieldable material capable of flexing outwardly thereby to enable outward radial flexing of the extreme end portion of the sleeve as the tool moves through such end portion during enlargement of said bore.

5. A machine tool having, a support, a honing element rotatable on and reciprocable along said support for enlarging a cylindrical bore formed through a sleeve with relatively thin side walls which tend to flex radially under the pressure exerted by the tool, the improvement in said machine tool comprising, a pair of spaced clamping assemblies mounted on said support adjacent opposite ends of the sleeve with one of the clamping assemblies being movable toward the other assembly to clamp the ends of the sleeve frictionally between the assemblies with an axially directed force, each of said clamping assemblies comprising a base mounted on said support adjacent an end of the sleeve, and a ring supported on each base with one end in end-to-end frictional clamping engagement with the adjacent end of the sleeve, each of said rings having axially stiff and radially flexible walls of resiliently yieldable material capable of flexing outwardly thereby to enable outward radial flexing of the end portion of the sleeve as the tool moves through such end portion and thus promote uniform flexing of the sleeve throughout its length during enlargement of the bore.

References Cited

UNITED STATES PATENTS

| | | | |
|---|---|---|---|
| 2,563,170 | 8/1951 | Hunt | 51—34.3 |
| 3,029,562 | 4/1962 | Kroen | 51—34 |

WILLIAM R. ARMSTRONG, Primary Examiner

U.S. Cl. X.R.

51—227; 269—287; 279—1